United States Patent
Ao et al.

(10) Patent No.: US 10,461,958 B2
(45) Date of Patent: Oct. 29, 2019

(54) PACKET TRANSMISSION METHOD AND APPARATUS

(71) Applicant: ZTE CORPORATION, Guangdong (CN)

(72) Inventors: Ting Ao, Guangdong (CN); Wei Meng, Guangdong (CN); Cui Wang, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/742,365

(22) PCT Filed: Mar. 18, 2016

(86) PCT No.: PCT/CN2016/076787
§ 371 (c)(1),
(2) Date: Jan. 5, 2018

(87) PCT Pub. No.: WO2016/177145
PCT Pub. Date: Nov. 10, 2016

(65) Prior Publication Data
US 2018/0198643 A1      Jul. 12, 2018

(30) Foreign Application Priority Data
Jul. 6, 2015   (CN) .......................... 2015 1 0392274

(51) Int. Cl.
*H04L 12/46*      (2006.01)
*H04L 12/851*     (2013.01)
(Continued)

(52) U.S. Cl.
CPC .......... *H04L 12/4633* (2013.01); *H04L 12/46* (2013.01); *H04L 12/4641* (2013.01);
(Continued)

(58) Field of Classification Search
None
See application file for complete search history.

(56) References Cited

U.S. PATENT DOCUMENTS 8,861,345 B2   10/2014  Hares et al.
2009/0323698 A1* 12/2009 Le Faucheur ....... H04L 12/4641
                                                    370/395.53
(Continued)

FOREIGN PATENT DOCUMENTS

| CN | 103200069 A | 7/2013 |
|---|---|---|
| CN | 104518940 A | 4/2015 |
| WO | 2013/067466 A1 | 5/2013 |

OTHER PUBLICATIONS

International Search Report dated Jun. 14, 2016 for International Application No. PCT/CN2016/076787, 7 pages.
(Continued)

*Primary Examiner* — Eunsook Choi
(74) *Attorney, Agent, or Firm* — Knobbe Martens Olson & Bear LLP

(57) ABSTRACT

The present disclosure provides a packet transmission method and apparatus. The method includes: a classifier receiving a first packet; the classifier determining a first service function (SF) to which the first packet is to be transmitted; the classifier adding an address of the first SF to the first packet, obtaining a second packet; and the classifier transmitting the second packet to a network virtualization edge (NVE) node.

16 Claims, 8 Drawing Sheets

(51) Int. Cl.
*H04L 29/06* (2006.01)
*H04L 12/715* (2013.01)

(52) U.S. Cl.
CPC .............. *H04L 29/06* (2013.01); *H04L 45/64* (2013.01); *H04L 47/2441* (2013.01); *H04L 2212/00* (2013.01)

(56) References Cited

U.S. PATENT DOCUMENTS

| | | | |
|---|---|---|---|
| 2013/0117449 A1 | 5/2013 | Hares et al. | |
| 2014/0029443 A1* | 1/2014 | Bhavanam | H04L 45/28 370/244 |
| 2014/0307744 A1 | 10/2014 | Dunbar et al. | |
| 2015/0195197 A1* | 7/2015 | Yong | H04L 45/74 370/392 |
| 2015/0281076 A1* | 10/2015 | Zhang | H04L 45/64 370/392 |

OTHER PUBLICATIONS

Written Opinion of the International Searching Authority dated Jun. 14, 2016 for International Application No. PCT/CN2016/076787, 4 pages.

Wang, et al., "IPv6 Service function Chain draft-wang-6man-ipv6-service-function-chain-00", IETF, Jul. 2, 2015, chapters 3, 5 and 7, 19 pages.

European Search Report dated Jan. 17, 2019 for Application No. EP 16 78 9139, 9 pages.

Wang W Meng ZTE Corporation C: "IPv6 Service function Chain; draft-wang-6man-ipv6-service-function-chain-00.txt", IPv6 Service Function Chain; Draft-Wang-6man-IPv6-Service-Function-Chain-00.Txt, Internect Engineering Task Force, IETF; Standardworkingdraft, Internet Society (ISOC) 4, Rue Des Falaises CH-1205 Geneva, Switzerland, Jul. 2, 3025, pp. 1-19, XP015107521.

Krishnan Brocade A Ghanwani Dell Pedro A Aranda Guiterrez D R Lopez Telefonica I+D J Halpern S Kini Ericsson R: "SFC OAM Requirements and Framework; draft-krishnan-sfc-oam-req-framework-00.txt",SFC OAM Requirements and Framework; Draft-Rkishnan-SFC-OAM-Req-Framework-00.Txt, Internet Engineering Task Force, IETF; Standardworkingdraft, Internet Society (ISOC) 4 Rue Des Falaises CH-1205 Geneva, Switzerland, Jul. 4, 2014, pp. 1-7.

Yong L Xia Huawei Q Zu Ericsson L: "Network Virtualization Edge (NVE); draft-yong-nvo3-nve-04.txt", Network Virtualization Edge (NVE); Draft-Yong-NVO3-NVE-04.Txt, Internet Engineering Task Force, IETF; Standardworkingdraft, Internet Society (ISOC) 4, Rue Des Falaises CH-1205 Geneva, Switzerland, Jun. 18, 2014 (Jun. 18, 2014), pp. 1-20, XP015099653.

Yong Huawei M Toy Comcast A Isaac Bloomberg V Manral Hewlett-Packard L Dunbar Huawei L: "Use Cases for DC Network Virtualization Overlays; draft-ietf-nvo3-use-case-04.txt", Use Cases for DC Network Virtualization Overlays; Draft-IETF-NVO3-Use-Case-04.Txt, Internet Engineering Task Force, IETF; Standardworkingdraft, Internet Society (ISOC) 4, Rue Des Falaises CH-1205 Geneva, Switzerland, Jul. 1, 2014 (Jul. 1, 2014), pp. 1-16, XP015099938.

* cited by examiner

PACKET TRANSMISSION METHOD AND APPARATUS

CROSS REFERENCE TO RELATED APPLICATIONS

This application is the U.S. National Phase Application under 35 U.S.C. § 371 of International Application No. PCT/CN2016/076787, filed Mar. 18, 2016, designating the U.S. and published as WO 2016/177145 A1 on Nov. 10, 2016, which claims the benefit of Chinese Patent Application No. 201510392274.4, filed Jul. 6, 2015, which are hereby incorporated by reference in their entirety.

TECHNICAL FIELD

The present disclosure relates to a communication field, and in particular, relates to a packet transmission method and apparatus.

BACKGROUND

In the related art, when entering a network, data accesses a large number of value-added service devices, such as antivirus devices, acceleration devices, firewall devices and Network Address Translation (NAT) devices. Undifferentiated traffic must pass through these service devices simultaneously, thus causing an unnecessary load on these devices, limiting optimization of service resources, and hindering rapid changes in service configurations due to complex configurations.

In view of these problems, a mode of service chain which is called Service Function Chain (SFC) is proposed at present. That is, all services are integrated to form a virtual service overlay having its own service topology that is decoupled from an underlay network and no longer restricted by a structure of the underlay network. A structure diagram of the SFC is shown in FIG. 1. FIG. 1 is a structure diagram of an SFC in the related art. A service through which traffic is to pass is determined by the SFC. A Service Function Path Identifier (SFPID) is added to each SFC and packets are classified into different levels by SFC. Different SFCs are allocated to the traffic at different levels (by an entrance classifying device). A forwarding device forwards a packet according to an identifier of an SFC. As a result, different service chain processions are implemented for different traffic to meet differentiated requirements.

The current SFC processing is shown in FIG. 1. An SF refers to a service function. A classifier is used for classifying packets and adding an SFC header to a packet. The packet carries a Service Function Path Identifier (SFPID) of the packet. An SFF refers to a service function forwarder. According to the SFPID carried in the packet, a corresponding SF or SFF is selected for packet forwarding. That is, for the packet received by the classifier or the SFF, the SFF forwards the packet to an SF that belongs to a service function path according to the SFPID of the packet. For the packet received by the SF, the SFF selects a next hop according to the SFPID of the packet and then transmits the packet to a next SFF according to an address of the next hop.

The Network Virtualization Overlays 3 (NVO3) working group of the Internet Engineering Task Force (IETF) proposes a Network Virtualization Edge (NVE) function. Through this function, a packet is encapsulated, enabled to access an overlay network and then forwarded. When traffic enters the overlay network, the packet is encapsulated and allocated an outer layer address of the overlay network by an NVE device. After reaching a destination NVE, the packet is first de-encapsulated and then transmitted to a destination host. When service chain processing is performed in the overlay network, it is needed to determine service chains to be used in different virtual networks, and a mapping between various virtual networks in the overlay network and various service chains is needed.

When an SFC function is added to an existing overlay network, an original NVE may not know about the SFC function, so it is needed to use software to enable a Virtual switch (Vswitch) of a host to support the SFC function. At this time, an NVE and an SFF may be physically separated from each other, so the NVE may not know about a next hop of the SFC and a packet is directly forwarded to an NVE where a destination host is located via a tunnel according to a destination address of the packet, failing to ensure that the packet is transmitted to a correct next-hop SFF via a tunnel of the overlay network for SF processing, and thus resulting in a wrong path of an entire service function chain.

No effective solution has been provided to solve a problem of failing to transmit, via a tunnel of an overlay network, a packet to a correct next-hop SFF for SF processing in the related art.

SUMMARY

The present disclosure provides a packet transmission method and apparatus to solve at least a problem of failing to transmit, via a tunnel of an overlay network, a packet to a correct next-hop SFF for SF processing in the related art.

According to one aspect of the present disclosure, a packet transmission method is provided. The method includes: a classifier receiving a first packet; the classifier determining a first service function (SF) to which the first packet is to be transmitted; the classifier adding an address of the first SF to the first packet to obtain a second packet; and the classifier transmitting the second packet to a network virtualization edge (NVE) node.

In an exemplary embodiment, the classifier determining the first service function (SF) to which the first packet is to be transmitted includes: the classifier classifying the first packet according to header information of the first packet; the classifier allocating a service function path identifier (SFPID) to the first packet according to a classification result and a virtual network identifier (VNID) to which a source site belongs; and the classifier determining the first SF according to the SFPID.

In an exemplary embodiment, the classifier adding the address of the first SF to the first packet through at least one of: the classifier replacing a destination address of the first packet with the address of the first SF; or, the classifier encapsulating the first packet in an outer encapsulation layer, herein a destination address of the outer encapsulation layer is the address of the first SF.

According to another aspect of the present disclosure, a packet transmission method is provided. The method includes: after a service function forwarder (SFF) receives a third packet, the SFF judging whether there is a third service function (SF) to which the third packet is to be transmitted; when a judging result is that there is the third SF, the SFF processing a destination address of the third packet as an address of the third SF to obtain a fourth packet; when the judging result is that there is not the third SF, the SFF processing the destination address of the third packet as an address of a destination site to obtain the fourth packet; and the SFF transmitting the fourth packet.

In an exemplary embodiment, the SFF judging whether there is the third SF to which the third packet is to be transmitted incudes: the SFF querying, according to a service function path identifier (SFPID), whether there is the third SF to which the third packet is to be transmitted, herein the SFPID is pre-allocated by a classifier and carried in a header of the third packet; when the address of the third SF is found according to the SFPID, the SFF determining that there is the third SF; and when the address of the third SF is not found according to the SFPID, the SFF determining that there is not the third SF.

In an exemplary embodiment, the SFF processing the destination address of the third packet as the address of the third SF includes at least one of: the SFF replacing the destination address of the third packet with the address of the third SF; or, the SFF encapsulating the third packet in an outer encapsulation layer, herein a destination address of the outer encapsulation layer is the address of the third SF.

In an exemplary embodiment, the SFF processing the destination address of the third packet as the address of the destination site includes: acquiring the address of the destination site pre-stored in a header of the third packet; and setting the address of the destination site to the destination address of the third packet.

According to another aspect of the present disclosure, a packet transmission apparatus is provided. The apparatus is applied to a classifier and includes: a receiving module, configured to receive a first packet; a determination module, configured to determine a first service function (SF) to which the first packet is to be transmitted; an adding module, configured to add an address of the first SF to the first packet to obtain a second packet; and a first transmitting module, configured to transmit the second packet to a network virtualization edge (NVE) node.

In an exemplary embodiment, the determination module includes: a classifying unit, configured to classify the first packet according to header information of the first packet; an allocating unit, configured to allocate a service function path identifier (SFPID) to the first packet according to a classification result and a virtual network identifier (VNID) to which a source site belongs; and a determination unit, configured to determine the first SF according to the SFPID.

In an exemplary embodiment, the adding module includes at least one of: a first replacing unit, configured to replace a destination address of the first packet with the address of the first SF; or, a first encapsulating unit, configured to encapsulate the first packet in an outer encapsulation layer, herein a destination address of the outer encapsulation layer is the address of the first SF.

According to another aspect of the present disclosure, a packet transmission apparatus is provided. The apparatus is applied to a service function forwarder (SFF) and includes: a judging module, configured to, after receiving a third packet, judge whether there is a third service function (SF) to which the third packet is to be transmitted; a processing module, configured to, when a judging result of the judging module is that there is the third SF, process a destination address of the third packet as an address of the third SF to obtain a fourth packet, and/or, when the judging result of the judging module is that there is not the third SF, process the destination address of the third packet as an address of a destination site to obtain the fourth packet; and a second transmitting module, configured to transmit the fourth packet.

In an exemplary embodiment, the judging module includes: a querying unit, configured to query, according to a service function path identifier (SFPID), whether there is the third SF to which the third packet is to be transmitted, herein the SFPID is pre-allocated by a classifier and carried in a header of the third packet; and a determination unit, configured to, when the address of the third SF is found according to the SFPID, determine that there is the third SF, and/or, when the address of the third SF is not found according to the SFPID, determine that there is not the third SF.

In an exemplary embodiment, when configured to process the destination address of the third packet as the address of the third SF, the processing module includes at least one of: a second replacing unit, configured to replace the destination address of the third packet with the address of the third SF; or, a second encapsulating unit, configured to encapsulate the third packet in an outer encapsulation layer, herein a destination address of the outer encapsulation layer is the address of the third SF.

In an exemplary embodiment, when configured to process the destination address of the third packet as the address of the destination site, the processing module includes: an acquiring unit, configured to acquire the address of the destination site pre-stored in a header of the third packet; and a setting unit, configured to set the address of the destination site to the destination address of the third packet.

Through the present disclosure, a classifier receives a first packet; the classifier determines a first service function (SF) to which the first packet is to be transmitted; the classifier adds an address of the first SF to the first packet to obtain a second packet; and the classifier transmits the second packet to a network virtualization edge (NVE) node. This solves a problem of failing to transmit, via a tunnel of an overlay network, a packet to a correct next-hop SFF for SF processing in the related art, and thereby achieves an effect of transmitting, via a tunnel of an overlay network, a packet to a correct next-hop SFF for SF processing.

DETAILED DESCRIPTION

The present disclosure will be described hereinafter in detail with reference to the accompanying drawings in combination with the embodiments.

It should be illustrated that, the terms "first" and "second", etc., in the specifications and claims as well as the above drawings of the present disclosure are used to distinguish similar objects but not necessarily used to describe a particular order or sequence.

Figure 1:
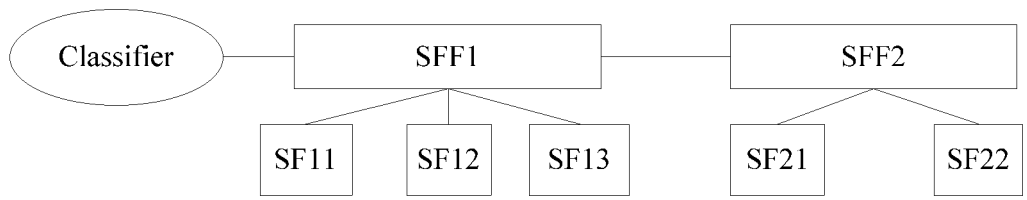
FIG. 1 is a structural diagram of an SFC in the related art.
Figure 2:
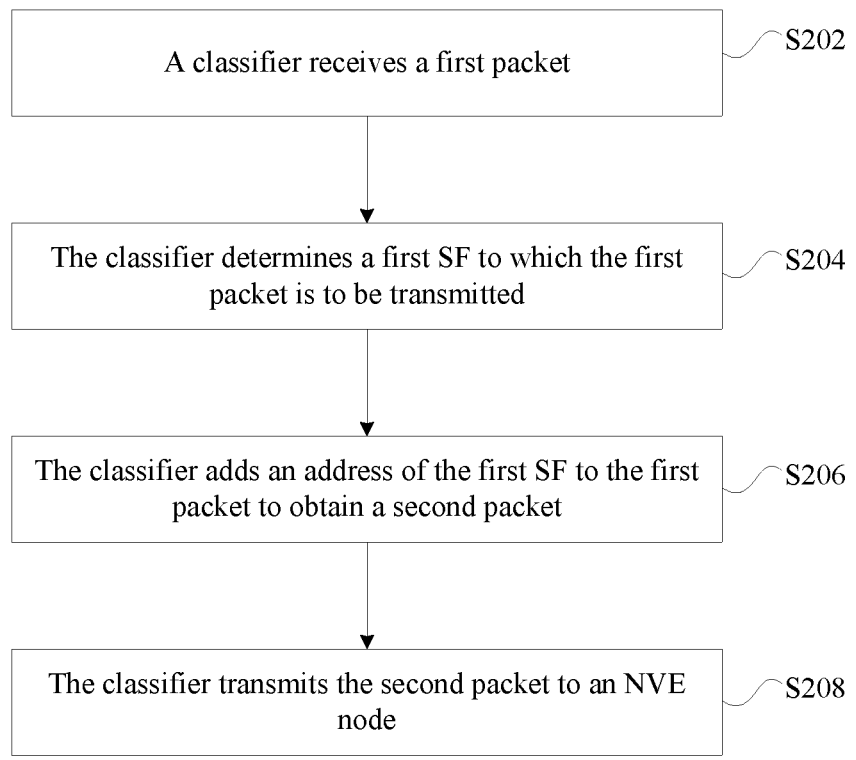
FIG. 2 is a flowchart of a first packet transmission method according to an embodiment of the present disclosure.

An embodiment provides a packet transmission method. FIG. 2 is a flowchart of a first packet transmission method according to an embodiment of the present disclosure. As shown in FIG. 2, the method includes steps described below.

In step S202, a classifier receives a first packet.

In step S204, the classifier determines a first service function (SF) to which the first packet is to be transmitted.

In step S206, the classifier adds an address of the first SF to the first packet to obtain a second packet.

In step S208, the classifier transmits the second packet to a network virtualization edge (NVE) node.

Through the above steps, before transmitting the packet to the NVE, the classifier adds the address of the first SF to the packet, so that the NVE receiving the packet can determine a next hop of an SFC of the packet so as to forward the packet to the correct next-hop SFF for SF processing, thereby allowing next-hop information to be carried to an NVE that does not know about the SFC and thus enabling an existing overlay network to be compatible with the SFC technology. This solves a problem of failing to transmit, via a tunnel of an overlay network, a packet to a correct next-hop SFF for SF processing in the related art, and thereby achieves an effect of transmitting, via a tunnel of an overlay network, a packet to a correct next-hop SFF for SF processing.

In an optional embodiment, multiple modes can be used to determine the first SF to which the first packet is to be transmitted. Here one of the multiple modes is described by way of example: The classifier classifies the first packet according to header information of the first packet; the classifier allocates a service function path identifier (SFPID) to the first packet according to a classification result and a virtual network identifier (VNID) to which a source site belongs; and the classifier determines the first SF according to the SFPID.

In an optional embodiment, the classifier adds the address of the first SF to the first packet includes at least one of: the classifier replaces a destination address of the first packet with the address of the first SF; and the classifier encapsulates the first packet in an outer encapsulation layer, herein a destination address of the outer encapsulation layer is the address of the first SF. When the first adding mode is adopted, since an original destination address of the first packet is an address of a destination host, the address of the destination host may be saved in an SFC header of the first packet, e.g., saved in a metadata field of the SFC header after the address of the destination host is replaced with a first address.

Figure 3:
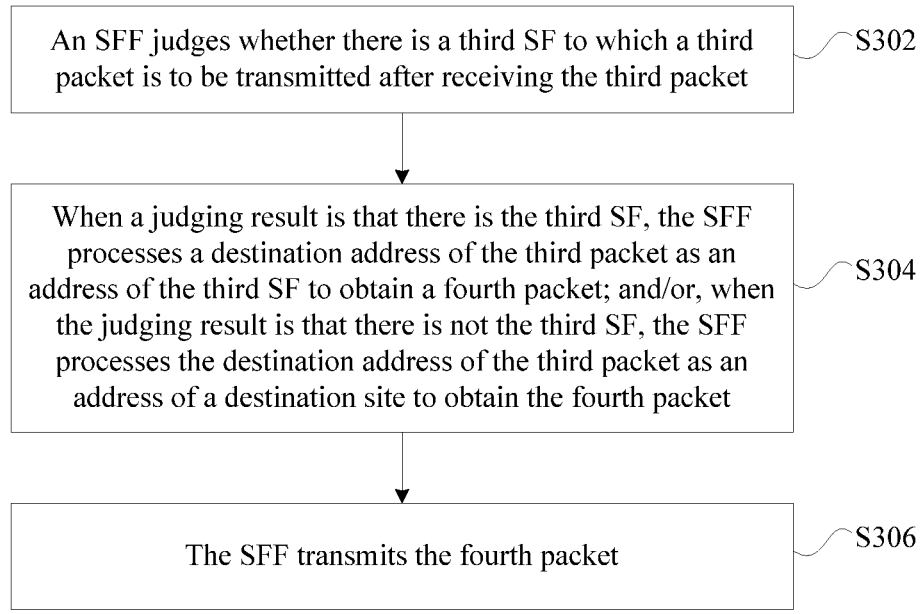
FIG. 3 is a flowchart of a second packet transmission method according to an embodiment of the present disclosure.

FIG. 3 is a flowchart of a second packet transmission method according to an embodiment of the present disclosure. As shown in FIG. 3, the method includes steps described below.

In step S302, after a service function forwarder (SFF) receives a third packet, the SFF judges whether a third service function (SF) to which the third packet is to be transmitted exists.

In step S304, when a judging result is that the third SF exists, the SFF processes a destination address of the third packet as an address of the third SF to obtain a fourth packet; and/or, when the judging result is that the third SF does not exist, the SFF processes the destination address of the third packet as an address of a destination site to obtain the fourth packet.

In step S306, the SFF transmits the fourth packet.

The SFF may transmit the fourth packet to an NVE when the SFF transmits the fourth packet. Through the above steps, before transmitting the third packet, the SFF will process the destination address of the third packet, the SFF processes the destination address of the third packet as an address of a correct next-hop SF or the address of the destination site, so that a device (e.g., NVE) receiving the fourth packet can learn an address of the next-hop of the fourth packet (e.g., the address of the third SF) and thus the fourth packet can be forwarded to a correct next hop. This solves a problem of failing to transmit, via a tunnel of an overlay network, a packet to a correct next-hop SFF for SF processing in the related art, and thereby achieves an effect of transmitting, via a tunnel of an overlay network, a packet to a correct next-hop SFF for SF processing.

In an optional embodiment, the SFF judging whether the third SF to which the third packet is to be transmitted exists includes: the SFF queries, according to a service function path identifier (SFPID), whether the third SF to which the third packet is to be transmitted exists, herein the SFPID is pre-allocated by a classifier and carried in a header of the third packet; when the address of the third SF is found according to the SFPID, the SFF determines that the third SF exists; and when the address of the third SF is not found according to the SFPID, the SFF determines that the third SF does not exist. In the present embodiment, whether the third SF exists may be queried according to the SFPID or, of course, via other modes. For example, when the packet is transmitted, a routing table is added to the packet, herein the routing table records the SF that the packet is to pass through. Therefore, a device that forwards the packet may determine a next hop of the packet according to the routing table, and then determine whether the third SF exists.

In an optional embodiment, the SFF processing the destination address of the third packet as the address of the third SF includes at least one of: the SFF replaces the destination address of the third packet with the address of the third SF; and the SFF encapsulates the third packet in an outer encapsulation layer, herein a destination address of the outer encapsulation layer is the address of the third SF. These two modes are merely examples. The address of the third SF may also be recorded in the third packet in other modes that are not listed herein.

In an optional embodiment, the SFF processing the destination address of the third packet as the address of the destination site includes: acquiring the address of the destination site pre-stored in a header of the third packet; and setting the address of the destination site to the destination address of the third packet. It can be determined from the above embodiments that when processing the packet, a classifier saves the address of the destination site in an SFC header of the packet (e.g., in a metadata field of the SFC header), and when the address of the destination site needs to be restored, the classifier restores the address of the destination site saved in the SFC header as the destination address of the third packet so as to forward the packet.

From the above description of the embodiments, it will be apparent to those skilled in the art that the method of any embodiment described above may be implemented by means of software plus a necessary general-purpose hardware platform, or may of course be implemented by hardware, but in many cases, the former is a preferred embodiment. Based on this understanding, the solution provided by the present disclosure substantially, or the part contributing to the related art, may be embodied in the form of a software product. The computer software product is stored on a storage medium (such as a ROM/RAM, a magnetic disk or an optical disk) and includes several instructions for enabling a terminal device (which may be a mobile phone, a computer, a server or a network device) to execute the method according to various embodiments of the present disclosure.

Embodiments of the present disclosure further provide a packet transmission apparatus for implementing the above-mentioned embodiments and preferred embodiments.

What has been described will not be repeated. As used below, the term "module" may be software, hardware or a combination thereof capable of implementing preset functions. The apparatus in each embodiment described below is preferably implemented by software, but implementation by hardware or by a combination of software and hardware is also possible and conceived.

Figure 4:
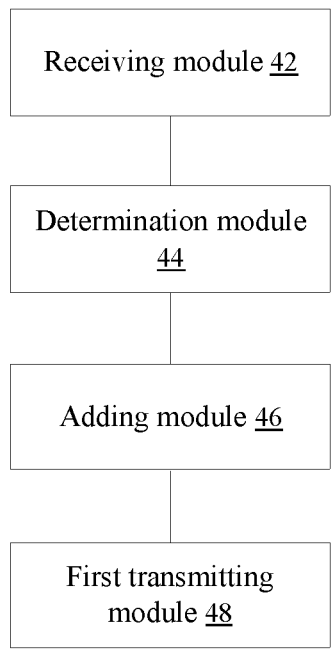
FIG. 4 is a structural block diagram of a first packet transmission apparatus according to an embodiment of the present disclosure.

FIG. 4 is a structural block diagram of a first packet transmission apparatus according to an embodiment of the present disclosure. As shown in FIG. 4, the apparatus is applied to a classifier and includes a receiving module 42, a determination module 44, an adding module 46 and a first transmitting module 48. The apparatus is described below.

The receiving module 42 is configured to receive a first packet. The determination module 44 is connected to the receiving module 42, and is configured to determine a first service function (SF) to which the first packet is to be transmitted. The adding module 46 is connected to the determination module 44, and is configured to add an address of the first SF to the first packet to obtain a second packet. The first transmitting module 48 is connected to the adding module 46, and is configured to transmit the second packet to a network virtualization edge (NVE) node.

Figure 5:
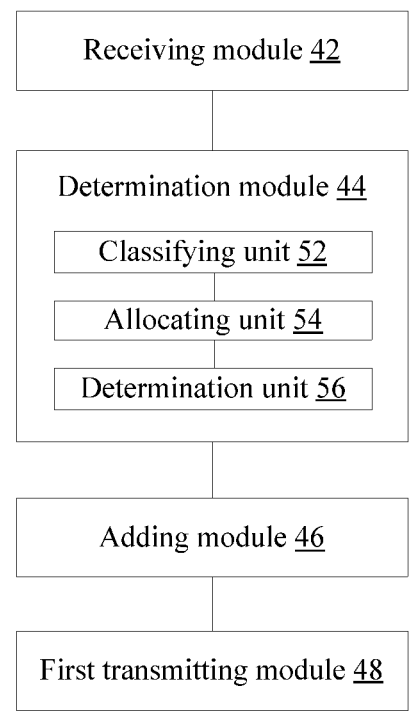
FIG. 5 is a structural block diagram of a determination module 44 in a first packet transmission apparatus according to an embodiment of the present disclosure.

FIG. 5 is a structural block diagram of a determination module 44 in a first packet transmission apparatus according to an embodiment of the present disclosure. As shown in FIG. 5, the determination module 44 includes a classifying unit 52, an allocating unit 54 and a determination unit 56. The determination module 44 is described below.

The classifying unit 52 is configured to classify the first packet according to header information of the first packet. The allocating unit 54 is connected to the classifying unit 52, and is configured to allocate a service function path identifier (SFPID) to the first packet according to a classification result and a virtual network identifier (VNID) to which a source site belongs. The determination unit 56 is connected to the allocating unit 54, and is configured to determine the first SF according to the SFPID.

Figure 6:
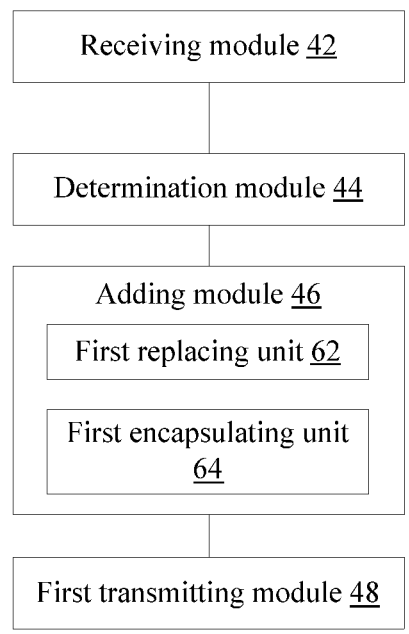
FIG. 6 is a structural block diagram of an adding module 46 in a first packet transmission apparatus according to an embodiment of the present disclosure.

FIG. 6 is a structural block diagram of an adding module 46 in a first packet transmission apparatus according to an embodiment of the present disclosure. As shown in FIG. 6, the adding module 46 includes a first replacing unit 62 and/or a first encapsulating unit 64. The adding module 46 is described below.

The first replacing unit 62 is configured to replace a destination address of the first packet with the address of the first SF. The first encapsulating unit 64 is connected to the first replacing unit 62, and is configured to encapsulate the first packet in an outer encapsulation layer, herein a destination address of the outer encapsulation layer is the address of the first SF.

Figure 7:
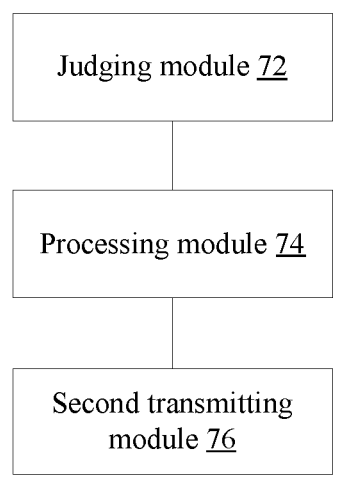
FIG. 7 is a structural block diagram of a second packet transmission apparatus according to an embodiment of the present disclosure.

FIG. 7 is a structural block diagram of a second packet transmission apparatus according to an embodiment of the present disclosure. As shown in FIG. 7, the apparatus is applied to a service function forwarder (SFF) and includes a judging module 72, a processing module 74 and a second transmitting module 76. The apparatus is described below.

The judging module 72 is configured to, after receiving a third packet, judge whether a third service function (SF) to which the third packet is to be transmitted exists. The processing module 74 is connected to the judging module 72, and is configured to, when a judging result of the judging module 72 is that the third SF exists, process a destination address of the third packet as an address of the third SF to obtain a fourth packet; and/or, when the judging result of the judging module 72 is that the third SF does not exist, process the destination address of the third packet as an address of a destination site to obtain the fourth packet. The second transmitting module 76 is connected to the processing module 74, and is configured to transmit the fourth packet.

Figure 8:
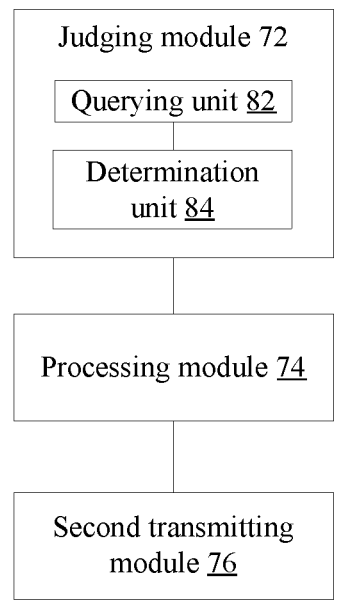
FIG. 8 is a structural block diagram of a judging module 72 in a second packet transmission apparatus according to an embodiment of the present disclosure.

FIG. 8 is a structural block diagram of a judging module 72 in a second packet transmission apparatus according to an embodiment of the present disclosure. As shown in FIG. 8, the judging module 72 includes a querying unit 82 and a determination unit 84. The judging module 72 is described below.

The querying unit 82 is configured to query, according to a service function path identifier (SFPID), whether the third SF to which the third packet is to be transmitted exists, herein the SFPID is pre-allocated by a classifier and carried in a header of the third packet. The determination unit 84 is connected to the querying unit 82, and is configured to, when the address of the third SF is found according to the SFPID, determine that the third SF exists; and/or, when the address of the third SF is not found according to the SFPID, determine that the third SF does not exist.

Figure 9:
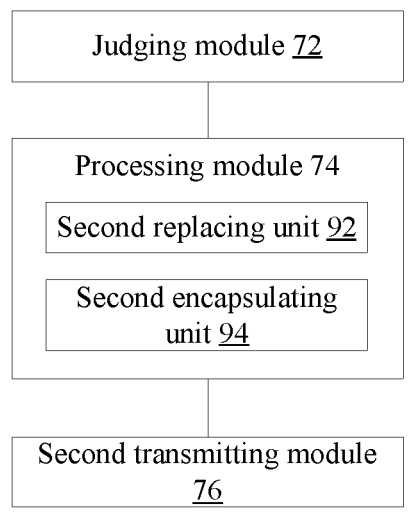
FIG. 9 is a structural block diagram 1 of a processing module 74 in a second packet transmission apparatus according to an embodiment of the present disclosure.

FIG. 9 is a structural block diagram 1 of a processing module 74 in a second packet transmission apparatus according to an embodiment of the present disclosure. As shown in FIG. 9, the processing module 74 includes a second replacing unit 92 and/or a second encapsulating unit 94. The processing module 74 is described below.

The second replacing unit 92 is configured to, when the destination address of the third packet is processed as the address of the third SF, replace the destination address of the third packet with the address of the third SF. The second encapsulating unit 94 is configured to, when the destination address of the third packet is processed as the address of the third SF, encapsulate the third packet in an outer encapsulation layer, herein a destination address of the outer encapsulation layer is the address of the third SF.

Figure 10:
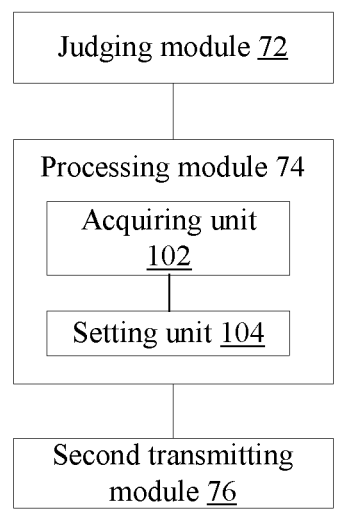
FIG. 10 is a structural block diagram 2 of a processing module 74 in a second packet transmission apparatus according to an embodiment of the present disclosure.

FIG. 10 is a structural block diagram 2 of a processing module 74 in a second packet transmission apparatus according to an embodiment of the present disclosure. As shown in FIG. 10, the processing module 74 includes an acquiring unit 102 and a setting unit 104. The processing module 74 is described below.

The acquiring unit 102 is configured to, when the destination address of the third packet is processed as the address of the destination site, acquire the address of the destination site pre-stored in a header of the third packet. The setting unit 104 is connected to the acquiring unit 102, and is configured to set the address of the destination site to the destination address of the third packet.

The solution provided by embodiments of the present disclosure is described from the perspective of the classifier and from the perspective of the SFF side separately in the embodiments described above, and it will be described as a whole hereinafter from the perspective of the classifier, NVE and SFF.

An object of embodiments of the present disclosure is to achieve intercommunication between an overlay network and a service function chain and to provide a method capable of ensuring a correct path of the service function chain and thus ensuring intercommunication between the overlay network and an SFC that accesses the overlay network when an SFF and an NVE are separate from each other. The solution provided by embodiments of the present disclosure is described below.

Before transmitting a packet to an overlay network, a classifier and an SFF find a next hop of the packet according to an SPFID, and a destination address (MAC, IP) of the original packet may be stored in the Metadata of an SFC header. Meanwhile, the destination address of the head of the SFC packet is encapsulated as an address corresponding to the next-hop SF of the SFC.

After receiving the packet, an NVE finds a mapping information about the tunnel according to the destination address of the packet, encapsulates the packet in the tunnel, and then forwards the packet to the next-hop SF via the tunnel.

When the packet reaches the last SFF of the SFC, the last SFF restores the saved final destination address from the Metadata of the SFC header and places the restored address in a destination address field of the packet. After receiving the packet, an NVE connected to the last SFF continues to map an internal destination address onto an external destination address for the packet, and then forwards the packet to the final destination host via a tunnel.

Embodiment 1

Figure 11:
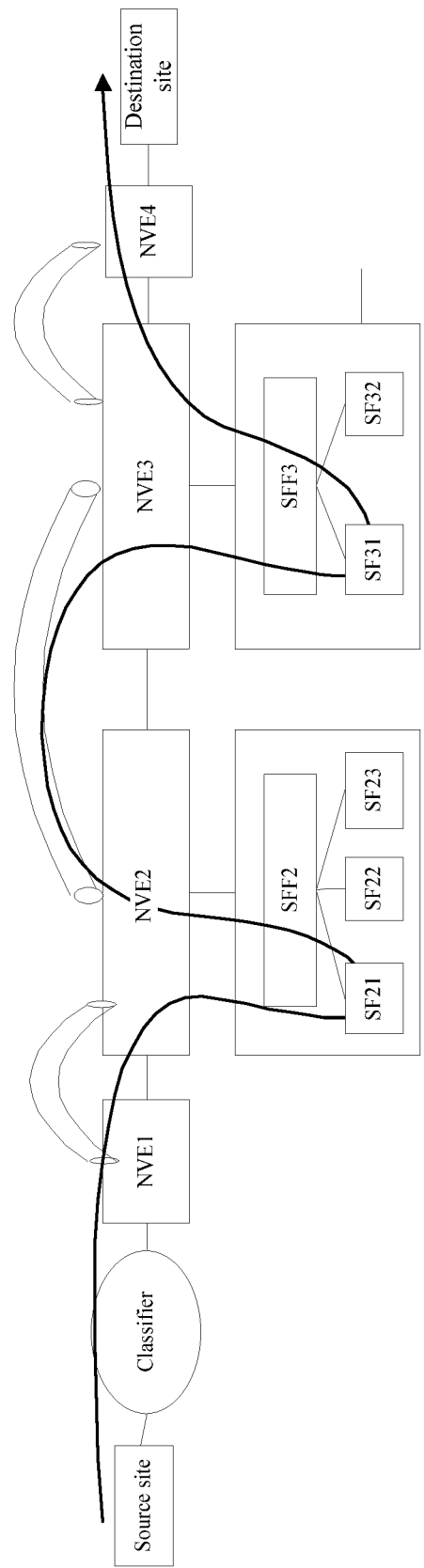
FIG. 11 is a network structural diagram 1 according to an embodiment of the present disclosure.

FIG. 11 is a network structural diagram 1 according to an embodiment of the present disclosure. A source device (corresponding to a source site of FIG. 11) transmits traffic to a destination device. The traffic is processed by a service function entity SF21 and a service function entity SF31, and then reaches a destination device 1 (corresponding to a destination site of FIG. 11). The service function entity SF21 and the service function entity SF31 form a service function chain (SFC). In the present embodiment, a packet transmitted from a source host (corresponding to the source site of FIG. 11) to a destination host (corresponding to the destination site of FIG. 11) should take a path of source host → grading device (same as the above classifier) → NVE1→ NVE2→ service function entity SF21→ NVE2→ NVE3→ service function entity 31→ NVE4→ destination host (The path is shown by arrows in FIG. 11).

The packet (corresponding to the above first packet) is transmitted from the source host to the destination host. A destination address in the packet is an address of the destination host. A source address in the packet is an address of the source host. The packet is classified by a classifier before accessing a network. The classifier classifies the packet according to information such as header information of the packet; allocates an SFPID to the packet according to a classification result and a virtual network identifier (VNID) to which the source host belongs and saves the SFPID, in a form of SFC header, in a header of the packet, where a mapping exists between the VNID and the SFPID; and saves a value (e.g., Tenant TLV) of the VNID in a metadata field of the SFC. Meanwhile, the classifier finds, according to the SFPID in the SFC header, an address of a next SF to which the packet is to be transmitted, replaces the destination address of the packet with an address of the SF21 (the packet with the destination address that has been replaced with the address of the SF21 corresponds to the above second packet), and meanwhile saves the address of the destination host in the metadata field of the SFC header.

When the packet carrying the SFC header reaches an edge of an overlay network, i.e., an NVE1, the NVE1 encapsulates the packet in an outer encapsulation layer. The NVE1 finds a corresponding VNID according to the virtual network to which the source host belongs, queries a mapping table according to the destination address of the packet, and finds, according to the address of the SF21, that an address of the outer encapsulation layer is an address of the NVE2. Therefore, when transmitting the packet to the NVE2, the NVE1 encapsulates the address of the NVE2 as the destination address of the outer encapsulation layer and the VNID is in a header of the outer encapsulation layer of the packet, and then forwards the packet to the NVE2 via a tunnel of the virtual network.

After receiving the packet, the NVE2 strips off the outer encapsulation layer, meanwhile maps the value of the VNID in the outer encapsulation layer onto a virtual local area network (VLAN) identifier (VID) and carries in the packet, and then transmits the packet first to an SFF2 according to the destination address SF21 in a header of an inner layer of the packet. Then the SFF2 forwards, according to the SFPID in the SFC header, to the SF21 for service processing.

After completing the processing, the SF21 returns the packet to the SFF2 (the packet received by the SFF2 corresponds to the above third packet). When receiving the packet from the SF side, and then further forwarding the packet, the SFF2 finds an address of a next-hop SF again according to the SFPID. In the present embodiment, a next hop of the SFC is the SF31. Therefore, the SFF2 will replace an address of the SF31 with the destination address of the inner layer, and then forwards the packet to the NVE2 (the packet with the destination address that has been replaced with the address of the SF31 corresponds to the above fourth packet).

After receiving the packet, the NVE2 queries the mapping table according to the SF31 of the inner layer address, finds the mapping NVE3 of the destination address of the inner layer onto a destination address of the outer encapsulation layer, and meanwhile maps the VID carried in the packet onto a VNID. Therefore, the NVE2 encapsulates the address of the NVE3 as the destination address of the outer encapsulation layer and the VNID in the packet, and then forwards the packet to the NVE3.

After forwarding the packet to the NVE3, the NVE3 strips off the outer encapsulation layer, meanwhile maps the value of the VNID in the outer encapsulation layer onto a VID of the VLAN and carries in the packet, and then forwards the packet first to an SFF3 according to the destination address SF31 in the header of the inner layer of the packet. Then the SFF3 forwards, according to the SFPID in the SFC header, to the SF31 for service processing.

After completing the processing, the SF31 returns the packet to the SFF3 (the packet received by the SFF3 corresponds to the above third packet). When receiving the packet from the SF side, and then further forwarding the packet, the SFF3 finds that the present service function entity is the last one of the SFC. Therefore, the SFF3 restores the destination host address originally stored in the metadata field of the SFC header to the destination address of the inner layer, meanwhile strips off the SFC header, and then forwards the packet to the NVE3 (the packet with the destination host address that has been restored corresponds to the above fourth packet).

After receiving the packet from the service function entity side, the NVE3 queries the mapping table according to the destination address (of the destination host) of the inner layer, finds the mapping NVE3 of the destination address of the inner layer onto a destination address of the outer encapsulation layer, and meanwhile maps the VID carried in the packet onto a VNID. Therefore, the NVE2 encapsulates the address of the NVE3 as the destination address of the outer encapsulation layer and the VNID in the packet, and then forwards the packet.

After the packet is forwarded to the NVE4 via a tunnel, the NVE4 strips off the outer encapsulation layer, and then forwards the packet to the destination host according to the destination address of the inner layer.

Embodiment 2

Figure 12:
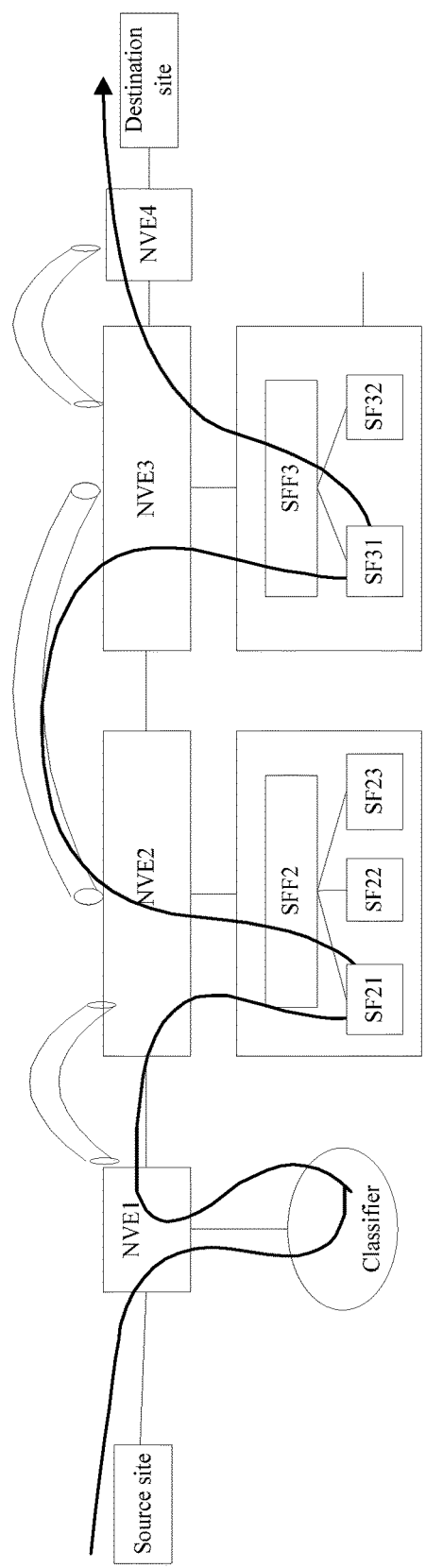
FIG. 12 is a network structural diagram 2 according to an embodiment of the present disclosure.

FIG. 12 is a network structural diagram 2 according to an embodiment of the present disclosure. As shown in FIG. 12, a source device transmits traffic to a destination device. The traffic is processed by a service function entity SF21 and a service function entity SF31, and then reaches a destination device 1. The service function entity SF21 and the service function entity SF31 form a service function chain (SFC). In the present embodiment, a packet transmitted from a source host to a destination host takes a path of source host → NVE1→ grading device (same as the above classifier) → NVE1→ NVE2→ service function entity SF21→ NVE2→ NVE3→ service function entity 31→ NVE4→ destination host.

This scenario is similar to that in the embodiment 1, but the traffic first accesses an overlay network, and then accesses the SFC for processing and the grading device is connected to the overlay network. The processing scenario is almost the same as that in the embodiment 1, but when the NVE1 strips off an outer encapsulation layer and transmits the traffic to the classifier, it is also needed to map a VNID onto a VID carried in the packet.

Embodiment 3

In the present embodiment, when traffic transmitted by a source host passes through a classifier, the classifier encapsulates an original packet in an outer encapsulation layer. A source address of the outer encapsulation layer is an address of the source host. A destination address of the outer encapsulation layer is an address of an SF21. When an encapsulated packet reaches an NVE1, the NVE1 maps the destination address of the outer encapsulation layer onto an address of an NVE2. Therefore, the NVE1 encapsulates the packet in a tunnel, and then forwards the packet to the NVE2 via the tunnel, and de-encapsulates the packet from the tunnel, and then transmits the packet to an SFF2. The SFF2 de-encapsulates the outer encapsulation layer, and then transmits the packet to the SF21.

After the SF21 completes the processing, the packet is retransmitted to the SFF2. When a next hop is searched for, it is found that the next hop is an SF31. Therefore, the SFF2 encapsulates the packet with an address in the outer encapsulation layer in which the source address is still the address of the source host and the destination address is modified to an address of the SF31, and then the SFF2 transmits the packet to the NVE2. The NVE2 maps the address of the SF31 onto an address of an NVE3.

Similarly, the NVE3 strips off a tunnel encapsulation layer, and then forwards the packet to the SF31 for processing. The SF31 transmits a processed packet to an SFF3.

Since the SFF3 is the last hop of an SFC, the SFF3 strips off the outer encapsulation layer to restore the original packet, and then transmits the original packet to an NVE3. The NVE3 maps an address of a destination host onto an address of an NVE4 and encapsulates the packet again, and then forwards the packet via a tunnel. The NVE4 receives the packet, and then strips off the address in the outer encapsulation layer.

Embodiment 4

In the present embodiment, in conjunction with the embodiment 3, a classifier encapsulates an original packet in an outer encapsulation layer. A source address of the outer encapsulation layer is an address of a source host. A destination address of the outer encapsulation layer is an address of an SFF2.

After the packet reaches the SFF2, the SFF2 strips off the outer encapsulation layer, and then transmits the packet to an SF21 for processing. After receiving the packet that has been processed by the SF21, the SFF2 finds a next-hop SFF3 and thus uses an address of the SFF3 as the destination address of the outer encapsulation layer, and then forwards the packet.

However, in the present embodiment, an SFF interacts with an NVE, and the SFF notifies an address of the SFF to the NVE to which the SFF is connected.

It should be illustrated that, the various modules described above may be implemented by software or hardware. Implementation by hardware may, but may not necessarily, be performed by the following modes: the modules described above are located in a same processor or in multiple processors respectively.

Embodiments of the present disclosure further provide a storage medium. In an exemplary embodiment, the storage medium may be configured to store program codes for executing the steps described below.

In step S1, a classifier receives a first packet.

In step S2, the classifier determines a first service function (SF) to which the first packet is to be transmitted.

In step S3, the classifier adds an address of the first SF to the first packet to obtain a second packet.

In step S4, the classifier transmits the second packet to a network virtualization edge (NVE) node.

In an exemplary embodiment, the storage medium is further configured to store program codes for executing the steps described below.

In step S1, after receiving a third packet, a service function forwarder (SFF) judges whether a third service function (SF) to which the third packet is to be transmitted exists.

In step S2, when a judging result is that the third SF exists, the SFF processes a destination address of the third packet as an address of the third SF to obtain a fourth packet; and/or, when the judging result is that the third SF does not exist, the SFF processes the destination address of the third packet as an address of a destination site to obtain the fourth packet.

In step S3, the SFF transmits the fourth packet.

In an exemplary embodiment, the storage medium may include, but is not limited to, a U disk, a read-only memory (ROM), a random access memory (RAM), a mobile hard disk, a magnetic disk, an optical disk or another medium capable of storing program codes.

In an exemplary embodiment, for specific examples in the present embodiment, reference may be made to the examples described in the above embodiments and optional embodiments, and the specific examples will not be repeated in the present embodiment.

As compared to the related art, embodiments of the present disclosure adopt a solution of an SFC domain accessing to an overlay network. In this solution, an SFC can be implemented freely without being restricted by devices in the overlay network. In particular, the solution is of great practical significance to implementation of virtualization of a data center network.

Apparently, those skilled in the art should know that various above-mentioned modules or steps of the present disclosure may be implemented by a universal computing device, they may be concentrated on a single computing device or distributed in a network formed by multiple computing devices, and alternatively, they may be implemented by program codes executable by the computing devices, so that they may be stored in a storage device for execution by the computing devices, and in some circumstances, the illustrated or described steps may be executed in sequences different from those described herein, or they may be made into various integrated circuit modules separately, or multiple modules or steps therein may be made into a single integrated circuit module for implementation. Therefore, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure are within the scope of protection of the present disclosure.

INDUSTRIAL APPLICABILITY

As described above, a packet transmission method and apparatus provided by embodiments of the present disclosure have the following beneficial effects: a problem of failing to transmit, via a tunnel of an overlay network, a packet to a correct next-hop SFF for SF processing in the related art is solved, so that an effect of transmitting, via a tunnel of an overlay network, a packet to a correct next-hop SFF for SF processing is achieved.

What is claimed is:

1. A packet transmission method, comprising:
   receiving, by a classifier, a first packet;
   determining, by the classifier, a first service function (SF) to which the first packet is to be transmitted;
   adding, by the classifier, an address of the first SF to the first packet to obtain a second packet; and
   transmitting, by the classifier, the second packet to a network virtualization edge (NVE) node,
   wherein determining, by the classifier, the first SF to which the first packet is to be transmitted comprises:
      classifying, by the classifier, the first packet according to header information of the first packet;
      allocating, by the classifier, a service function path identifier (SFPID) to the first packet according to a classification result and a virtual network identifier (VNID) associated with a source site; and
      determining, by the classifier, the first SF according to the SFPID,
   wherein the method is performed by at least one processor.

2. The method of claim 1, wherein adding, by the classifier, the address of the first SF to the first packet comprises at least one of:
   replacing, by the classifier, a destination address of the first packet with the address of the first SF; or
   encapsulating, by the classifier, the first packet in an outer encapsulation layer, wherein a destination address of the outer encapsulation layer includes the address of the first SF.

3. A non-transitory computer-readable storage medium storing instructions which, when executed by a processor, cause the processor to perform the method according to claim 2.

4. A non-transitory computer-readable storage medium storing instructions which, when executed by a processor, cause the processor to perform the method according to claim 1.

5. A packet transmission method, comprising:
   determining, by a service function forwarder (SFF), whether there is a third service function (SF) to which a third packet is to be transmitted after receiving the third packet;
   in response to determining that there is the third SF, processing, by the SFF, a destination address of the third packet as an address of the third SF to obtain a fourth packet;
   in response to determining that there is not the third SF, processing, by the SFF, the destination address of the third packet as an address of a destination site to obtain the fourth packet; and
   transmitting, by the SFF, the fourth packet
   wherein determining, by the SFF, whether there is the third SF to which the third packet is to be transmitted comprises:
      querying, by the SFF according to a service function path identifier (SFPID), whether there is the third SF to which the third packet is to be transmitted, wherein the SFPID is pre-allocated by a classifier and carried in a header of the third packet;
      in response to finding the address of the third SF according to the SFPID, determining, by the SFF, that there is the third SF; and
      in response to not finding the address of the third SF according to the SFPID, determining, by the SFF, that there is not the third SF.

6. The method of claim 5, wherein processing, by the SFF, the destination address of the third packet as the address of the third SF comprises at least one of:
   replacing, by the SFF, the destination address of the third packet with the address of the third SF; or
   encapsulating, by the SFF, the third packet in an outer encapsulation layer, wherein a destination address of the outer encapsulation layer includes the address of the third SF.

7. A non-transitory computer-readable storage medium storing instructions which, when executed by a processor, cause the processor to perform the method according to claim 6.

8. The method of claim 5, wherein processing, by the SFF, the destination address of the third packet as the address of the destination site comprises:
   acquiring the address of the destination site pre-stored in a header of the third packet; and
   setting the address of the destination site to the destination address of the third packet.

9. A non-transitory computer-readable storage medium storing instructions which, when executed by a processor, cause the processor to perform the method according to claim 5.

10. A packet transmission apparatus, comprising:
a processor; and
a storage device, wherein the storage device stores computer-executable software programs, and the software programs comprise:
   a receiving module, configured to receive a first packet;
   a first determination module, configured to determine a first service function (SF) to which the first packet is to be transmitted;
   an adding module, configured to add an address of the first SF to the first packet to obtain a second packet;
   a first transmitting module, configured to transmit the second packet to a network virtualization edge (NVE) node,
   wherein the first determination module comprises:
      a classifying module, configured to classify the first packet according to header information of the first packet; and
      an allocating module, configured to allocate a first service function path identifier (SFPID) to the first packet according to a classification result and a virtual network identifier (VNID) associated with a source site;
      where the first determination module is further configured to determine the first SF according to the first SFPID.

11. The apparatus of claim 10, wherein the adding module comprises at least one of:
   a first replacing module, configured to replace a destination address of the first packet with the address of the first SF; or
   a first encapsulating module, configured to encapsulate the first packet in an outer encapsulation layer, wherein a destination address of the outer encapsulation layer includes the address of the first SF.

12. The apparatus of claim 10, wherein the software programs further comprise:
   a second determination module, configured to determine whether there is a third service function (SF) to which a third packet is to be transmitted after receiving the third packet;
   a processing module, configured to process at least one of: in response to a determination of the second determination module that there is the third SF, destination address of the third packet as an address of the third SF to obtain a fourth packet; or, in response to the determination of the second determination module that there is not the third SF, the destination address of the third packet as an address of a destination site to obtain the fourth packet; and
   a second transmitting module, configured to transmit the fourth packet.

13. The apparatus of claim 12, wherein the second transmitting module comprises:
   a querying module, configured to query, according to a second SFPID, whether there is the third SF to which the third packet is to be transmitted, wherein the second SFPID is pre-allocated by a first classifying module and carried in a header of the third packet; and
   a third determination module, configured to determine at least one of: in response to finding the address of the third SF according to the second SFPID, that there is the third SF; or, in response to not finding the address of the third SF according to the second SFPID, that there is not the third SF.

14. The apparatus of claim 12, wherein the processing module configured to process the destination address of the third packet as the address of the third SF comprises at least one of:
   a second replacing module, configured to replace the destination address of the third packet with the address of the third SF; or
   a second encapsulating module, configured to encapsulate the third packet in an outer encapsulation layer, wherein a destination address of the outer encapsulation layer is the address of the third SF.

15. The apparatus of claim 12, wherein the processing module configured to process the destination address of the third packet as the address of the destination site comprises:
   an acquiring module configured to acquire the address of the destination site pre-stored in a header of the third packet; and
   a setting module configured to set the address of the destination site to the destination address of the third packet.

16. The apparatus of claim 12, the receiving module, the first determination module, the adding module and the first transmitting module are applied in a second classifying module; or
   the second determination module, the processing module and the second transmitting module are applied in a service function forwarder (SFF).

* * * * *